Nov. 10, 1925.
E. HEITMAN ET AL
1,561,076
JOURNAL BEARING AND HOUSING
Filed Aug. 23, 1921  2 Sheets-Sheet 1
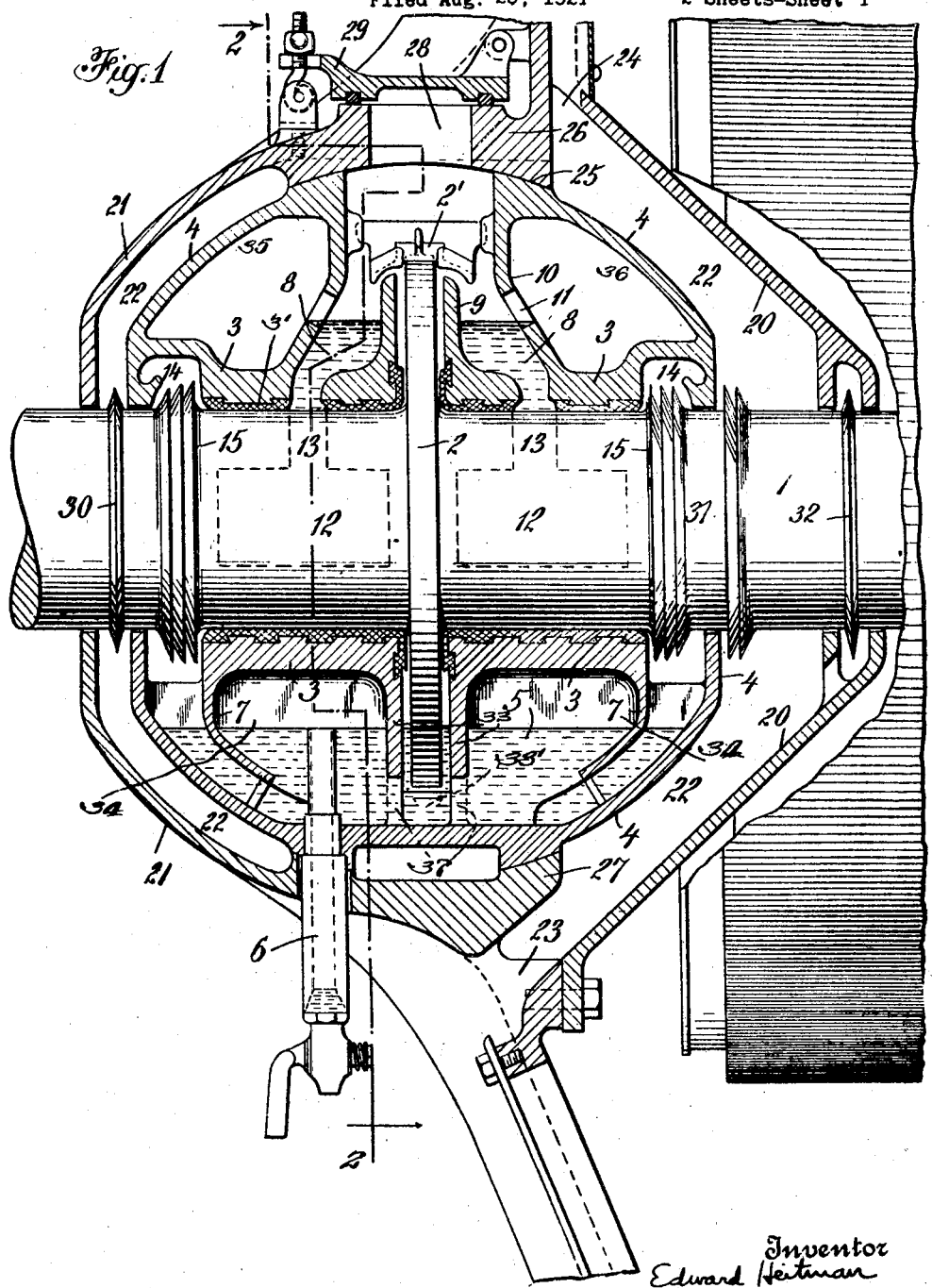
Fig.1
Inventor
Edward Heitman
John F. Trudeau
By their Attorneys
Pennie, Davis, Marvin & Edmonds.

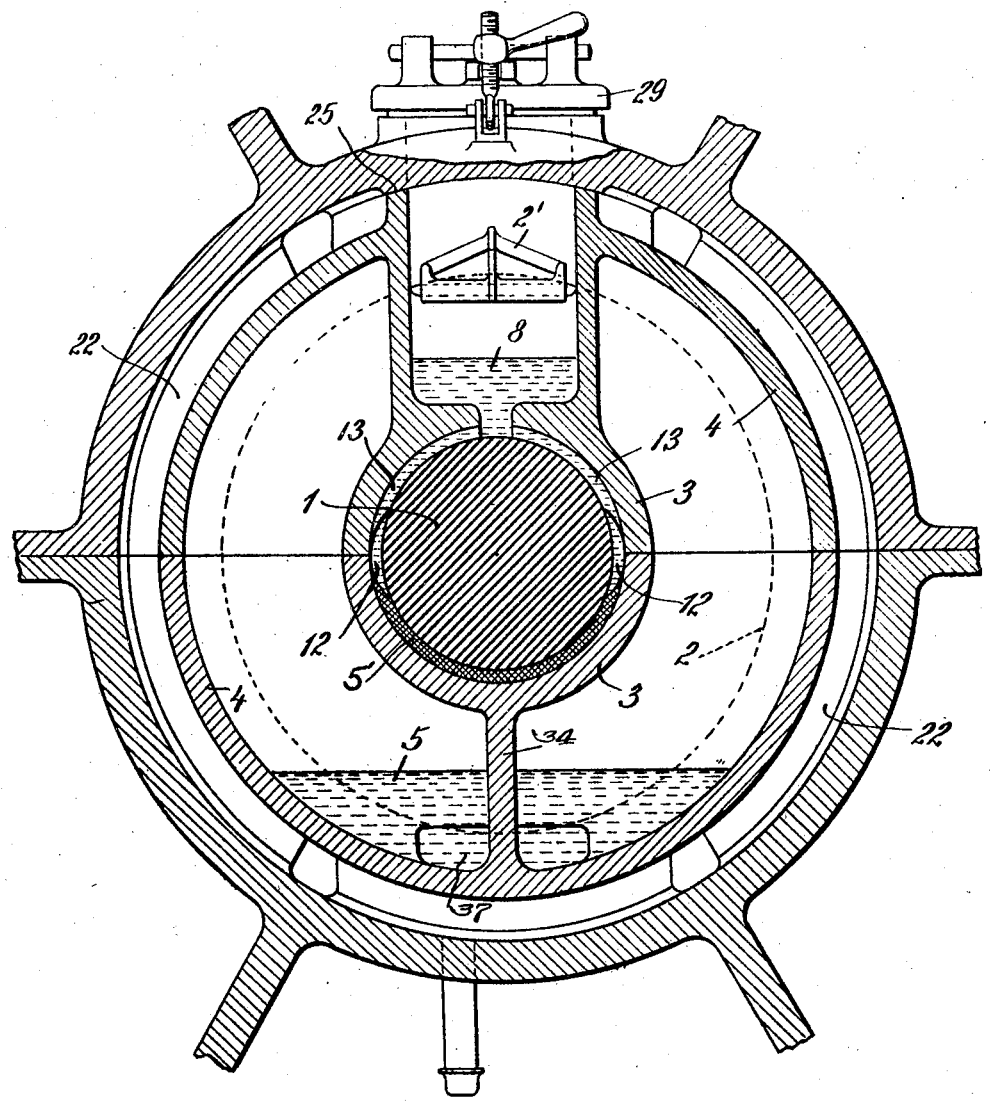

Patented Nov. 10, 1925.

1,561,076

UNITED STATES PATENT OFFICE.

EDWARD HEITMAN, OF JERSEY CITY, AND JOHN F. TRUDEAU, OF BAYONNE, NEW JERSEY, ASSIGNORS TO ELECTRO DYNAMIC COMPANY, OF BAYONNE, NEW JERSEY, A CORPORATION OF NEW JERSEY.

JOURNAL BEARING AND HOUSING.

Application filed August 23, 1921. Serial No. 494,620.

*To all whom it may concern:*

Be it known that we, EDWARD HEITMAN, a resident of Jersey City, State of New Jersey, and JOHN F. TRUDEAU, a resident of Bayonne, State of New Jersey, have invented certain new and useful Improvements in Journal Bearings and Housings; and we do hereby declare the following to be a full, clear, and exact description of the invention, such as will enable others skilled in the art to which it appertains to make and use the same.

This invention has for its object the provision of improved self-lubricating journal bearings, particularly for use in electric motors, but of course, applicable to bearings in general. The improved bearing contains within itself a reservoir for lubricating oil, particularly adapted for cooperation with an oil lifting device for automatically lubricating the bearing; the bearing is self-aligning; and leakage of oil along the shaft due to splashing, or air suction, is effectively prevented.

The improved bearing is self-lubricated by a disc rotating with the journal, this disk dipping in a bath of oil. The bearing sleeve surrounding the journal is itself formed as a receptacle for the lubricant; that is to say, the sleeve contains as a part thereof the main oil reservoir, and no other main reservoir is used. The oil lifting disc carries oil from the oil reservoir in the sleeve up to a wiper which takes it off and delivers it into a supplementary oil pocket or auxiliary reservoir from which it passes to the journal. The confinement of the oil within the main reservoir prevents its splashing against the oil slingers on the shaft; if the oil were splashed against the slingers, as might result from the rolling of a ship, there would be some leakage of oil past the slingers. The improved arrangement effectively prevents such leakage.

The oiling disc on the journal delivers an excess of oil to the supplementary oil pocket above the journal, so that a constant head of oil is maintained in such reservoir, resulting in thorough lubrication at all times.

In order to provide for self-alignment of the bearing, the bearing sleeve is adjustably mounted on curved seats in a journal box or housing, so that it may readily adapt itself to the shaft alignment and to minor vibrations and displacements thereof. In large bearings a substantial problem is presented in providing radiation sufficient to adequately cool the bearing; we therefore provide air passageways around the journal sleeve through which cooling air is forced or drawn.

In the accompanying drawings, a preferred embodiment of the invention is shown; it should however be understood that the invention is not limited to the precise structure there shown, but that the essential features may be embodied in other mechanically equivalent devices.

In the drawings Fig. 1 is a sectional view of our improved journal bearing and housing therefor; and Fig. 2 is a view taken on the line 2—2 of Fig. 1.

In these drawings, the motor shaft or journal indicated at 1, is provided with an oil lifting disc 2. The journal is supported in a bearing sleeve, comprising the inner annular walls 3 and outer annular walls or shell 4.

The outer shell 4 is approximately spherical in shape and the inner wall 3 is substantially cylindrical, extends longitudinally through the bearing sleeve, and is lined on its interior surface with bearing metal 3'. This inner cylindrical wall is joined with the outer shell 4 by a pair of spaced transversely arranged flange-like web members 33 disposed about midway between the ends of the bearing and forming between them a circular pocket 33' in which the oil lifting disc 2 rotates. The bottom of the inner wall 3 is also joined to the bottom of the outer shell 4 on each side of the flange-like webs 33 by the longitudinally extending web member or partition 34.

The inner and outer walls 3 and 4 contain between them a main oil reservoir 5, this reservoir consisting of two annular chambers 35 and 36 which are divided longitudinally at the bottom by the wall 34 to form four small chambers interconnected by the restricted openings 37. These openings are provided in the flange-like web members 33 to allow the oil to enter the space between them in which the oil lifting disc 2 rotates, and also to place the four chambers in communication with each other. An oil overflow pipe 6 extends into the main reservoir 5 for establishing the proper height of the oil in this reservoir, the reservoir being filled with oil, preferably while the journal is stationary, until the oil overflows through this pipe.

The oiling disc 2 dips into the oil in the reservoir 5 and carries it into the upper part of the bearing sleeve, where the oil is wiped off by a wiping device 2' of any desired character. The oil thus lifted into the upper part of the bearing sleeve flows into a pair of oil pockets or auxiliary reservoirs 8 formed by walls 9 and 10 upwardly extending from the inner walls 3. The disc 2 is of such size as to lift an excess of oil into the oil pockets 8, such excess of oil overflowing through the holes 11 back into the main reservoir 5. The excess of oil passing out through the overflow openings 11 is distributed over the outer surface of walls 10 and flows downwardly in two semi-circular paths around the outer circumferences of the inner wall 3, thence over the surface of the longitudinal web member 34 and into the pool of oil in the main reservoir. Thus, the excess oil discharged over these surfaces of the inner walls 3 takes up a large portion of the heat in these walls which has been developed at the rubbing surfaces of the journal and carries it into the pool of oil in the main reservoir where the heat can be more readily transferred through the walls of the outer shell 4 and carried away by the current of air passing over the exterior surface of the shell. As shown more particularly in Fig. 2, the journal 1 is provided with longitudinal grooves 12 which are adapted to continually lubricate the journal as it turns. The grooves 13 each communicate with the oil pockets 8 from which they are continuously supplied with oil, and so keep the grooves 12 in the journal filled with oil whereby the bearing surfaces are effectively lubricated.

At the inner and outer ends of the bearing, the walls 3 and 4 are connected and are shaped to form oil catch pockets 14. The journal immediately adjacent the oil catch pockets 14 is provided with a plurality of oil slingers 15 which throw off any oil that may tend to creep along the shaft, into the catch pockets, from which it drains back into the main oil reservoir 5, being carried thereto by a passageway formed between the outer wall 4 of the shell and the partition walls 7 which extend downwardly below the lowest operating level of the oil in the main reservoir. In this way an oil seal is provided at each end of the bearing sleeve which excludes the possibility of air passing through the interior of the bearing sleeve and drawing oil or oil vapors from the sleeve into other parts of the machine upon which the bearing is employed.

The just described bearing sleeve, enclosed within its outer walls 4, is mounted in a journal box or housing, generally spherical in shape and comprising inner and outer annular walls 20 and 21 respectively, which are spaced from the walls 4 of the bearing sleeve to provide an air channel between the walls of the bearing sleeve and the journal box. This air circulating space, indicated at 22, is for the circulation of cooling air around the bearing sleeve; this cooling air may enter through the inlet opening 23, pass upwardly around the bearing sleeve and out at the exit 24. Any suitable means for causing the circulation of air may be used.

In order to provide for self-alignment of the bearing with the motor shaft, the top and bottom outside portions of the outer wall 4 of the bearing sleeve are spherically curved, as indicated at 25, the top and bottom inside portions, 26 and 27 respectively, of the journal box being correspondingly curved. This mounting is in effect a ball and socket or universal one, and therefore allows the bearing to adjust itself to changes in alignment and to deflections of the shaft. The upper portion 26 of the journal box is provided with a hand hole 28 and a suitable cover 29 for the same, for giving access to the oiling disc 2 and the wiping device 2'. The shaft 1 may be provided with additional oil slingers 30, 31 and 32, if desired.

The improved self-aligning bearing of the present invention may be used to particular advantage wherever it is desired to economize space, and at the same time essential that a bearing be used that is adequately cooled and that provides effective lubrication with relatively little attention. It is especially adapted for use on shipboard where not only the consideration of small space is important, but where the rolling and pitching of the ship tends to splash the oil against the shaft and allow it to escape from the bearing. The presence of the transverse flange-like webs 33 and the longitudinal web 34 insures a particularly rigid support for the lower part of the wall 3 upon which the pressure of the journal is received. These members also cause the subdivision of the main oil reservoir into a plurality of chambers of relatively small dimensions, so that churning of the oil is practically negligible. This subdivision of the reservoir into a plurality of small chambers together with the presence of the partition walls 7 which extend below the surface of the lowest operating level of the oil removes any possibility of oil splashing against the shaft or the oil slingers 15.

We claim:—

1. A journal bearing having a substantially cylindrical longitudinal inner wall extending therethrough for supporting the journal, an outer shell spaced from said cylindrical inner wall, a main oil reservoir between the inner wall and the outer shell, an auxiliary reservoir formed between the upper part of said inner wall and the outer shell adapted to distribute oil by gravity to the bearing surfaces, means for lifting from the main to the auxiliary reservoir an amount of oil in excess of that distributed to the bearing surfaces, and means for causing the excess oil to flow over the exterior surface of the inner wall so as to carry away the heat developed at the journal surfaces.

2. A journal bearing having a substantially cylindrical longitudinal wall for supporting the journal, a main oil reservoir below the longitudinal wall, an auxiliary reservoir above the longitudinal wall adapted to distribute oil to the bearing surfaces, means for raising from the main to the auxiliary reservoir an amount of oil in excess of that distributed to the bearing surfaces, and means for causing the excess oil to flow over the exterior surface of the longitudinally extending wall to carry off the heat developed at the journal surfaces.

3. The combination in a journal bearing, of a chambered bearing sleeve having an outer shell with a substantially cylindrical longitudinal inner wall extending therethrough for supporting the journal, a main oil reservoir between the inner wall and the outer shell, the bottom of the outer shell forming the bottom of this reservoir, an auxiliary reservoir formed between the upper part of said inner wall and the outer shell adapted to distibute oil by gravity to the bearing surfaces, means for lifting from the main to the auxiliary reservoir an amount of oil in excess of that distributed to the bearing surfaces, and means for causing the excess oil to flow over the exterior surface of the inner wall so as to carry heat developed at the journal surfaces to the oil in the main reservoir and thus to the outer shell of the bearing sleeve.

4. The combination in a journal bearing, of a support, and a chambered bearing sleeve in self-aligning relation therewith and having an outer shell with a substantially cylindrical longitudinal inner wall extending therethrough for supporting the journal, a main oil reservoir between the inner wall and the outer shell, the bottom of the outer shell forming the bottom of this reservoir, an auxiliary reservoir formed between the upper part of said inner wall and the outer shell adapted to distribute oil by gravity to the bearing surfaces, means for lifting from the main to the auxiliary reservoir an amount of oil in excess of that distributed to the bearing surfaces, and means for causing the excess oil to flow over the exterior surface of the inner wall so as to carry heat developed at the journal surfaces to the oil in the main reservoir and thus to the outer shell of the bearing sleeve, said support being provided with a casing substantially surrounding said sleeve and spaced therefrom to form a passageway for cooling air over the surface of said sleeve.

5. The combination in a journal bearing, of a support, and a chambered bearing sleeve in self-aligning relation therewith and having an outer shell with a substantially cylindrical longitudinal inner wall extending therethrough for supporting the journal, a main oil reservoir between the inner wall and the outer shell, the bottom of the outer shell forming the bottom of this reservoir, an auxiliary reservoir formed between the upper part of said inner wall and the outer shell adapted to distribute oil by gravity to the bearing surfaces, means for lifting from the main to the auxiliary reservoir an amount of oil in excess of that distributed to the bearing surfaces, and one or more overflow openings in the walls of the auxiliary reservoir for discharging the excess of oil over the exterior surface of the inner walls so as to carry heat developed at the journal surfaces to the oil in the main reservoir and thus to the outer shell of the bearing sleeve.

6. A bearing sleeve comprising, an outer shell having a substantially cylindrical longitudinal inner wall extending therethrough for supporting a journal, transversely positioned flange-like webs joining said inner wall with the shell and forming with the shell a plurality of annular chambers, a longitudinally extending web joining the bottom of the inner wall with the shell and subdividing said chambers, the plurality of chambers thus formed being connected at the bottom by a restricted passageway through said flanges to form a main oil reservoir, an auxiliary oil reservoir formed between the top of the cylindrical inner wall and the outer shell, and means for lifting oil from the main to the auxiliary reservoir.

7. The combination in a journal bearing, of a support, and a chambered bearing sleeve in aligning relation therewith and having an outer shell with a substantially cylindrical longitudinal inner wall extending therethrough for supporting the journal, a main oil reservoir between the inner wall and the outer shell, the bottom of the outer shell forming the bottom of this reservoir, an auxiliary reservoir formed between the upper part of said inner wall and the outer shell adapted to distribute oil by gravity to the bearing surfaces, means for lifting from the main to the auxiliary reservoir an amount of oil in excess of that distributed to the bearing surfaces, and means for causing the excess oil to flow over the exterior surface of the inner wall so as to carry heat developed at the journal surfaces to the oil in the main reservoir and thus to the outer shell of the bearing sleeve, said support being provided with a casing substantially surrounding said sleeve and spaced therefrom to form a passageway for cooling air over the surface of said sleeve, said sleeve having a pocket adjacent each end of the longitudinal inner wall to receive the oil distributed from the auxiliary reservoir after it has passed between the journal surfaces, and means coacting with each pocket for returning the oil collected thereby to the main reservoir at points below the lowest operating level of the oil therein, said means forming an oil seal to prevent the passage of air through the bearing sleeve.

8. A bearing sleeve comprising, an outer shell having a substantially cylindrical longitudinal inner wall extending therethrough for supporting a journal, a pair of transversely positioned flange-like webs joining said inner wall with the shell and forming with the shell two annular chambers, a longitudinally extending web joining the bottom of the inner wall with the shell and subdividing said chambers, the plurality of chambers thus formed being connected at the bottom by a restricted passageway through said flanges to form a main oil reservoir, an auxiliary oil reservoir formed between the top of the cylindrical inner wall and the outer shell, and a disc on the journal disposed between the flange-like webs for lifting oil from the main to the auxiliary reservoir.

In testimony whereof we affix our signatures.

EDWARD HEITMAN.
JOHN F. TRUDEAU.